(12) United States Patent
Severinsson

(10) Patent No.: US 11,333,206 B2
(45) Date of Patent: May 17, 2022

(54) ELECTRICAL ACTUATOR

(71) Applicant: BorgWarner Sweden AB, Landskrona (SE)

(72) Inventor: Lars Severinsson, Hishult (SE)

(73) Assignee: BorgWarner Sweden AB, Landskrona (SE)

( * ) Notice: Subject to any disclaimer, the term of this patent is extended or adjusted under 35 U.S.C. 154(b) by 0 days.

(21) Appl. No.: 17/261,214

(22) PCT Filed: Jul. 5, 2019

(86) PCT No.: PCT/EP2019/068120
§ 371 (c)(1),
(2) Date: Jan. 19, 2021

(87) PCT Pub. No.: WO2020/016029
PCT Pub. Date: Jan. 23, 2020

(65) Prior Publication Data
US 2021/0277962 A1 Sep. 9, 2021

(30) Foreign Application Priority Data
Jul. 19, 2018 (SE) .................................. 1850927-3

(51) Int. Cl.
*F16D 28/00* (2006.01)
*F16D 41/20* (2006.01)
(Continued)

(52) U.S. Cl.
CPC ........... *F16D 28/00* (2013.01); *F16D 41/206* (2013.01); *F16D 2121/24* (2013.01); *F16D 2125/585* (2013.01)

(58) Field of Classification Search
CPC .... F16D 28/00; F16D 41/206; F16D 2121/24; F16D 2125/585; F16D 41/20; F16D 41/203
See application file for complete search history.

(56) References Cited

U.S. PATENT DOCUMENTS 2,004,650 A * 6/1935 Collyear ............... F16D 41/206
74/7 R
9,291,253 B1 3/2016 Serkh
(Continued)

FOREIGN PATENT DOCUMENTS

DE 102017119079 A1 3/2018
EP 2280182 A1 2/2011
(Continued)

*Primary Examiner* — Ernesto A Suarez
*Assistant Examiner* — Lori Wu
(74) *Attorney, Agent, or Firm* — Brooks Group, PLC

(57) ABSTRACT

The actuator (20) comprises an electric drive means (22) and a drive member (26) being rotationally driven upon activation of the electric drive means (22), an output member (24) being rotationally connected to the drive member (26) by means of a first spring (28), and a second spring (32) being connected to the output member (24) and forming a one way clutch between the output member (24) and a fixed tube (34), wherein the electrical actuator (20) further comprises a regulation cup (30) being configured to engage with the second spring (32) to disconnect the output member (24) from the fixed tube (34).

12 Claims, 2 Drawing Sheets

(51) Int. Cl.
   *F16D 121/24*     (2012.01)
   *F16D 125/58*     (2012.01)

(56) References Cited

U.S. PATENT DOCUMENTS

2016/0230814 A1   8/2016   Schumann et al.
2017/0298995 A1   10/2017  Serkh et al.

FOREIGN PATENT DOCUMENTS

| EP | 2990681 A2    | 3/2016  |
| GB | 2386653 A     | 9/2003  |
| WO | 2012130531 A1 | 10/2012 |
| WO | 2017129610 A2 | 8/2017  |

\* cited by examiner

ELECTRICAL ACTUATOR

TECHNICAL FIELD

The present invention relates to an electrical actuator to be used in automotive applications. More particularly, the present invention relates to a latching mechanism for such electrical actuator.

BACKGROUND

Vehicles are typically provided with a number of paired rotational members which need to be selectively connected to each other in order to allow for a desired torque transfer between the respective members. For example, such members may be an input drive shaft and an output drive shaft, or an output shaft of an electrical motor and an associated drive train member.

Selective torque transfer between two rotational members is typically regulated by means of a clutch, and appropriate control of such clutch. The clutch may e.g. be a disc clutch or a dog clutch, having one side being connected to a rotational input shaft and a second side being connected to an output shaft which, upon closing of the clutch, is urged to rotate with the rotational input shaft.

Clutch control requires an actuator. Although various types exist on the market, there is an increasing demand for electrical actuators. An electrical actuator is typically operating against an elasticity; in case of a dog clutch the elasticity is provided by means of a return spring biasing the dog clutch towards an unconnected mode, and in case of a disc clutch the elasticity is provided by means of the intrinsic biasing of the individual discs. The elasticity ensures that no torque transfer is present when the drive current is zero. This configuration is due to safety reasons, preventing unintentional lock-up of the clutch. On the other hand, it is required to counteract the elasticity during clutch activation whereby high current must be supplied to the actuator during stationary torque transfer.

In order to reduce power consumption, but also to protect the electrical actuator from overheating, it is desired to bring down the stationary holding torque of the electrical actuator while still ensuring zero holding torque when there is no drive current. An improved electrical actuator is therefore required.

SUMMARY

It is an object to provide an improved electrical actuator which can alleviate some of the problems of prior art. Also, it is an object to provide an electrical actuator which provides the desired operational functionality by means of a simple, robust, reliable, and cost-effective manner.

According to a first aspect, an electrical actuator is provided. The electrical actuator comprises an electric drive means and a drive member being rotationally driven upon activation of the electric drive means, an output member being rotationally connected to the drive member by means of a first one way spring clutch, and a second spring being connected to the output member and forming a one way clutch between the output member and a fixed tube forming part of a stationary housing. The electrical actuator further comprises a regulation cup being configured to engage with the second spring to disconnect the output member from the fixed tube.

The drive member and the output member may be arranged coaxially.

The regulation cup may surround the drive member as well as the output member.

A first end of the first spring may be fixed to the output member, and a second end of the first spring may be fixed to the drive member as well as to the regulation cup.

The second spring may be maneuverable between an idle position in which the output member is connected to the fixed tube, and an open position in which the output member is disconnected from the fixed tube.

The first spring may be configured to provide for an automatic return rotation of the output member when the second spring is maneuvered into its open position.

The regulation cup may have a circular end at the axial position of a radially protruding end of the second spring, and at least one axial edge being configured to push the end of the second spring upon rotation of the regulation cup.

The axial edge of the circular end may be formed by an interface between an axially longer portion of the circular end and an axially shorter portion of the circular end.

According to a second aspect, a clutch is provided. The clutch comprises an electrical actuator according to the first aspect.

The clutch may be provided with elastic properties arising from a return biasing feature of the clutch.

According to a third aspect, a vehicle is provided. The vehicle comprises at least one clutch according to the second aspect.

BRIEF DESCRIPTION OF THE DRAWINGS

The invention will be described in further details below with reference to the accompanying drawings, in which.

DETAILED DESCRIPTION

Figure 1:
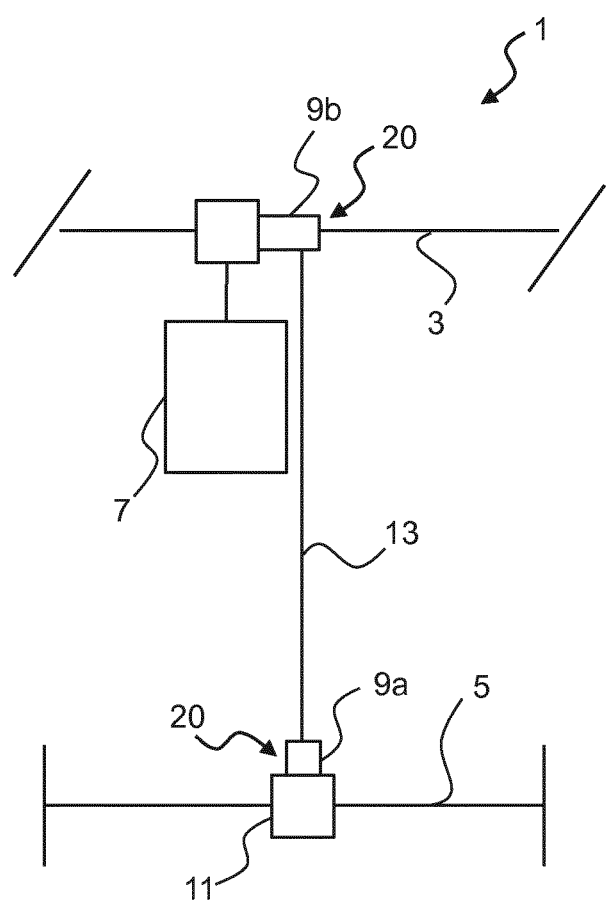
FIG. 1 is a schematic view of a vehicle according to an embodiment.

In FIG. 1 a vehicle 1 is shown schematically. The vehicle 1 has a front axle 3, a rear axle 5, and a propulsion unit 7 being connected to the front axle 3, the rear axle 5, or both. The vehicle 1 is provided with one or more clutches 9a-b. In the shown example a first clutch 9a is arranged at the rear axle 5 to allow for all wheel drive of the vehicle 1. The first clutch 9a is for this purpose a disc clutch 9a being arranged at a rear axle differential 11, and by activating the disc clutch 9a the rear axle 5 is receiving drive torque from the propulsion unit 7.

The vehicle 1 of the shown example is also equipped with a second clutch 9b, here in the form of a dog clutch 9b arranged at the front axle 3 and configured to disconnect the rear axle 5 (as well as a cardan shaft 13) from the drive train. When driving in two wheel drive mode, the dog clutch 9b is disconnected thereby reducing the rotating masses of the vehicle 1. When four wheel drive mode is requested, the disc clutch 9a is activated to spin up the cardan shaft 13, whereafter the dog clutch 9b is activated to connect the rear axle 5 to the propulsion unit 7 (via the dog clutch 9b and the disc clutch 9a).

At least one clutch 9a-b is regulated by means of an actuator 20, which will be further described in the following. However, before turning to details of the electrical actuator 20 it should be noted that the exact configuration of the vehicle 1 shown in FIG. 1 is only for illustrative purposes.

It should be readily understood that the vehicle 1 could in principle have any possible configuration, as long as there is at least one electrical actuator 20 arranged in conjunction with any suitable clutch 9a-b. Such examples include transfer cases, electric drive trains, torque vectoring systems, etc.

Figure 2:
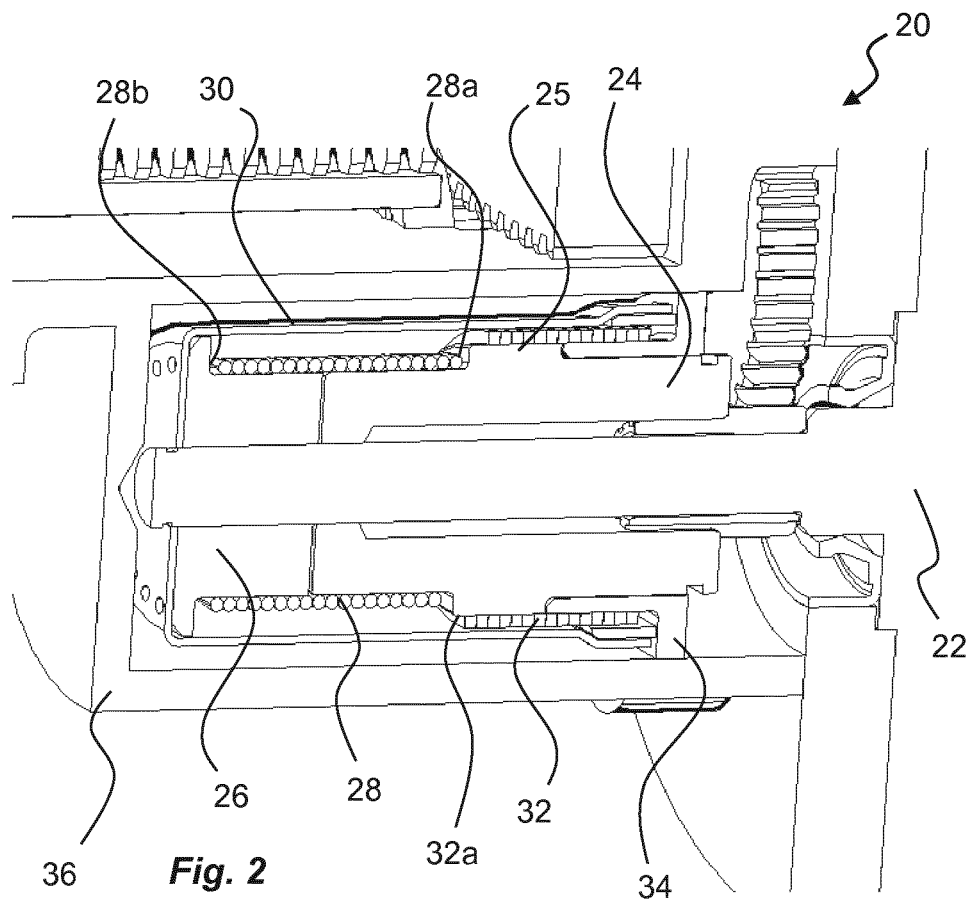
FIG. 2 is a cross-sectional view of an electrical actuator according to an embodiment.

An embodiment of an electrical actuator 20 is show in FIG. 2. The electrical actuator 20 comprises an electric drive means 22, e.g. a DC motor, a brushless DC motor, or a rotational solenoid. The electrical actuator 20 also has an output member 24 which is in connection with a clutch (not shown) through any suitable connection or gearing. As explained earlier, the clutch may e.g. be a dog clutch 9b or a disc clutch 9a. Importantly, the associated clutch 9a-b forms an elastic system, i.e. it is provided with a return biasing feature such that the output member 24 is subjected to a return force, as will be explained further below. Preferably, the clutch is configured such that rotation of the output member 24 will control actuation of the clutch.

The electric drive means 22 is connected to a drive member 26, which is configured to rotate upon activation of the electric drive means 22. With reference to the output member 24 the drive member 26 forms an input shaft. The drive member 26 is connected to the output member 24 by means of a return rotation spring 28 forming a one way clutch. The drive member 26 and the output member 24 are arranged coaxially, and having axial ends facing each other. The return rotation spring 28 is arranged around the outer circumference of the drive member 26 and the output member 24. One end 28a of the return rotation spring 28 is secured to the output member 24, for example by inserting the end 28a into a drilled radial hole of the output member 24. The opposite end 28b of the return rotation spring 28 is securely attached to the drive member 26, and to a thereto connected regulation cup 30. The regulation cup 30 is thus rotationally secured to the drive member 26.

When the electric drive means 22 is activated the drive member 26 will rotate, thus also causing the return rotation spring 28 to rotate. As one end 28a of the return rotation spring 28 is fixed to the output member 24, the diameter of the return rotation spring 28 will decrease until it comes into contact with the external surfaces of the drive member 26 and the output member 28. Consequently, rotation of the output member 24 is accomplished. This rotational motion of the output member 24 corresponds to the action of actuating the associated clutch, for example by compressing a spring or by urging discs towards each other.

The outer circumference of the output member 24 is also provided with a spring forming a one way spring clutch 32. For this, the output member 24 is provided with a radial extension 25 onto which the spring 32 is arranged; the spring 32 is thereby arranged at a different radial, as well as axial position as compared to the return rotation spring 28. One end 32a of the spring 32 is rotationally fixed to the output member 24, e.g. by means of inserting the end 32a into a drilled radial hole. The spring 32 is clamped around a fixed tube 34, forming part of a stationary housing 36. Hence, when the electric drive means 22 is activated rotation of the output member 24 will also allow the spring 32 to rotate around the fixed tube 34.

When the desired rotation of the output member 24 is reached, i.e. when the associated clutch 9a-b is actuated in the desired manner, the current being supplied to the electric drive means 22 is significantly reduced, such as down to a level of 5-25%, preferably 10% compared to the current required during actuation. This corresponds to a so called holding position, in which the output member 24 of the actuator 20 is intended to retain its position obtained by rotation of the drive member 26. This current is sufficient to drive the electric drive means 22 to keep the drive member 26 in position, while the provision of the spring 32 will prevent automatic return movement of the output member 24. This is due to the fact that the friction between the spring 32 and the fixed tube 34 prevents automatic return rotation of the output member 24 relative the fixed tube 34, whereby the spring 32 will accommodate the torque through the fixed tube 34.

Figure 3:
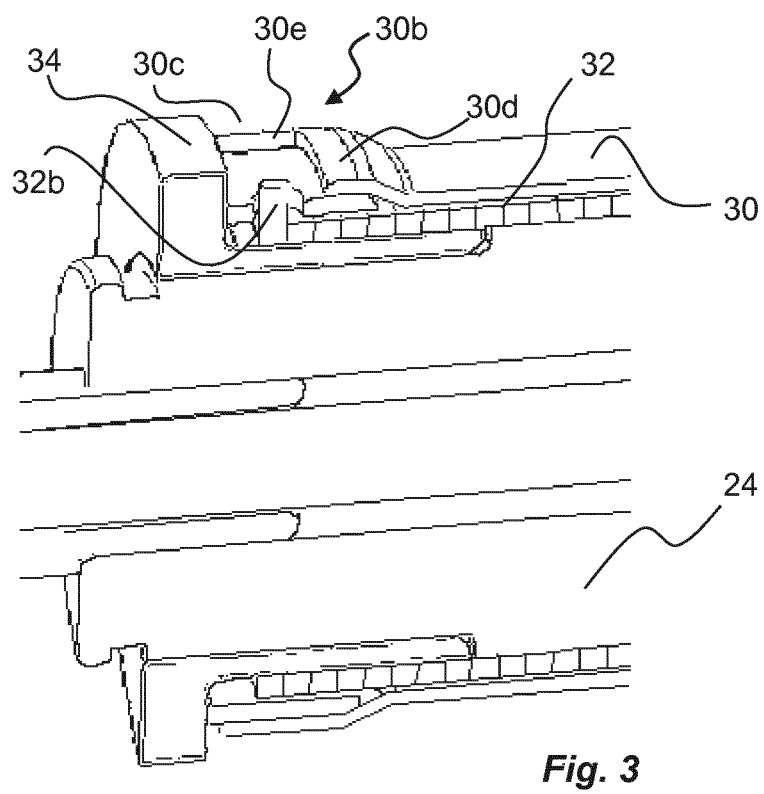
FIG. 3 is an isometric view of parts of the electrical actuator shown in FIG. 1.

When actuation is completed the drive current is shut off, thus leading to zero torque supplied by the electric drive means 22. The return rotation spring 28 will then be allowed to rotate the drive member 26 and the electric drive means 22 backwards, which also causes a corresponding rotational movement of the regulation cup 30. The regulation cup 30 surrounds not only the drive member 26, but also the output member 24 and extends as a sleeve surrounding these two members 24, 26. As already mentioned, one end 30a of the regulation cup 30 is rotationally fixed to the drive member 26. The opposite end 30b has a circular shape, as illustrated in FIG. 3. This circular end 30b has a portion of its circumference being axially cut off, such that a first portion 30c of the periphery of this end 30b has a somewhat greater axial length than another portion 30d of the periphery. The two portions 30c-d are arranged adjacent to each other and together forming the entire circular periphery, which means that two axial edges 30e are formed at the interface between the two portions 30c-d. The axial length and diameter of the circular end 30b of the regulation cup 30 is dimensioned such that an axial end 30e can come into contact with a radial protruding end 32b of the spring 32.

As the regulation cup 30 rotates backwards the axial end 30e will eventually touch and push the radial end 32b of the spring 32, causing its clutch functionality to open, whereby the output member 24 rotates backwards.

The embodiments described herein allow for a very simple, yet robust and reliable, electrical actuator which allows for i) automatic return movement of the output member 24 when drive current is zero, and ii) significantly reduced drive current required to hold the output member 24 in its actuated position.

The invention claimed is:

1. An electrical actuator (20), comprising an electric drive means (22) and a drive member (26) being rotationally driven upon activation of the electric drive means (22), an output member (24) being rotationally connected to the drive member (26) by means of a first one way spring clutch (28), and a second spring (32) being connected to the output member (24) and forming a one way clutch between the output member (24) and a fixed tube (34) forming part of a stationary housing, wherein the electrical actuator (20) further comprises a regulation cup (30) being configured to engage with the second spring (32) to disconnect the output member (24) from the fixed tube (34), wherein a first end (28a) of the first spring (28) is fixed to the output member (24), and a second a second end (28b) of the first spring (28) is fixed to the drive member (26) as well as to the regulation cup (30).

2. The electrical actuator (20) according to claim 1, wherein the drive member (26) and the output member (24) are arranged coaxially.

3. The electrical actuator (20) according to claim 2, wherein the regulation cup (30) surrounds the drive member (26) as well as the output member (24).

4. The electrical actuator (20) according to claim 1, wherein the regulation cup (30) surrounds the drive member (26) as well as the output member (24).

5. The electrical actuator (20) according to claim 1, wherein the second spring (32) is maneuverable between an idle position in which the output member (24) is connected to the fixed tube (34), and an open position in which the output member (24) is disconnected from the fixed tube (34).

6. The electrical actuator (20) according to claim 1, wherein the first spring (28) is configured to provide for an automatic return rotation of the output member (24) when the second spring (32) is maneuvered into an open position.

7. The electrical actuator (20) claim 1, wherein the regulation cup (30) has a circular end (30b) at the axial position of a radially protruding end (32b) of the second spring (32), and at least one axial edge (30e) being configured to push the protruding end (32b) of the second spring (32) upon rotation of the regulation cup (30).

8. The electrical actuator (20) according to claim 7, wherein the axial edge (30e) of the circular end (30b) is formed by an interface between an axially longer portion (30c) of the circular end (30b) and an axially shorter portion (30d) of the circular end (30b).

9. A clutch (9a-b), comprising an electric drive means (22) and a drive member (26) being rotationally driven upon activation of the electric drive means (22), an output member (24) being rotationally connected to the drive member (26) by means of a first one way spring clutch (28), and a second spring (32) being connected to the output member (24) and forming a one way clutch between the output member (24) and a fixed tube (34) forming part of a stationary housing, wherein the electrical actuator (20) further comprises a regulation cup (30) being configured to engage with the second spring (32) to disconnect the output member (24) from the fixed tube (34), wherein a first end (28a) of the first spring (28) is fixed to the output member (24), and a second end (28b) of the first spring (28) is fixed to the drive member (26) as well as to the regulation cup (30).

10. The clutch (9a-b) according to claim 9, wherein the clutch (9a-b) is provided with elastic properties arising from a return biasing feature of the clutch (9a-b).

11. A vehicle (1), comprising at least one clutch (9a-b) according to claim 10.

12. A vehicle (1), comprising at least one clutch (9a-b) comprising an electric drive means (22) and a drive member (26) being rotationally driven upon activation of the electric drive means (22), an output member (24) being rotationally connected to the drive member (26) by means of a first one way spring clutch (28), and a second spring (32) being connected to the output member (24) and forming a one way clutch between the output member (24) and a fixed tube (34) forming part of a stationary housing, wherein the electrical actuator (20) further comprises a regulation cup (30) being configured to engage with the second spring (32) to disconnect the output member (24) from the fixed tube (34), wherein a first end (28a) of the first spring (28) is fixed to the output member (24), and a second end (28b) of the first spring (28) is fixed to the drive member (26) as well as to the regulation cup (30).

* * * * *